United States Patent [19]

Boileau et al.

[11] 4,243,787

[45] Jan. 6, 1981

[54] BULK ANIONIC POLYMERIZATION PROCESS USING AN ALKALI METAL AMIDE AND THE SALT OF THE SAME ALKALI METAL WITH A HYDROXYLIC COMPOUND

[75] Inventors: Sylvie L. Boileau, Paris; Paul J. Caubere, Nancy; Gilberte Ndebeka, Vandoeuvre; Serge L. Lecolier, Janville sur Juine; Serge F. Raynal, Draveil, all of France

[73] Assignee: Societe Nationale des Poudres et Explosifs, Paris, France

[21] Appl. No.: 957,889

[22] Filed: Nov. 6, 1978

[30] Foreign Application Priority Data

Nov. 23, 1977 [FR] France .............................. 77 35221

[51] Int. Cl.$^3$ ................................................ C08F 4/48
[52] U.S. Cl. .................................... 526/180; 526/178; 526/181; 526/265; 526/293; 526/211; 526/328; 526/346; 526/336; 526/314; 526/335
[58] Field of Search ............ 526/181, 180, 211, 346 S, 526/352 E, 328 M, 293, 336, 314, 335, 265 EP

[56] References Cited

U.S. PATENT DOCUMENTS 2,849,432  8/1958  Kibler et al. .......................... 526/180
3,935,177  1/1976  Muller et al. ......................... 526/180

FOREIGN PATENT DOCUMENTS 2355941  5/1975  Fed. Rep. of Germany ........... 526/180
2449784  4/1976  Fed. Rep. of Germany ........... 526/180

OTHER PUBLICATIONS

Textbook of Polymer Chemistry by Billmeyer, p. 318, 1970, 2nd Ed.

*Primary Examiner*—William F. Hamrock
*Attorney, Agent, or Firm*—Bucknam and Archer

[57] ABSTRACT

The invention relates to a process for the anionic polymerization and copolymerization of vinyl, dienic and heterocyclic monomers.

According to the invention, the process consists in carrying out the reaction in the presence of an initiator consisting of a molecular combination of an alkali metal amide and the salt of the same alkali metal with at least one hydroxylic compound and in the absence of solvent. The initiator can be prepared by intimately mixing its constituents or in the presence of a solvent of low polarity which is subsequently evaporated off, or in situ in the monomer.

Application to the synthesis of special or widely used polymers and copolymers.

6 Claims, No Drawings

BULK ANIONIC POLYMERIZATION PROCESS USING AN ALKALI METAL AMIDE AND THE SALT OF THE SAME ALKALI METAL WITH A HYDROXYLIC COMPOUND

The present invention relates to a process for the anionic polymerisation and copolymerisation of vinyl, dienic and heterocyclic monomers.

The use of anionic polymerisation techniques is accompanied by constraints which severely restrict the general development of these techniques. In fact, it is necessary to operate under very rigorous conditions of cleanliness of the reactants and absence of moisture and to use expensive polar solvents and very moisture-sensitive reaction initiators which are also expensive and difficult to use.

During the last decade, real progress has been accomplished in terms of the efficiency and/or the costs of certain aspects of anionic polymerisation. However, there remains a genuine need for flexible and efficient processes permitting low production costs.

The advantages of the process according to the invention are that it has a very general applicability, makes the operating conditions considerably less critical and substantially lowers the production costs, in every aspect.

The process, according to the invention, for the anionic polymerisation and copolymerisation of vinyl, dienic and heterocyclic monomers is characterised in that the reaction is carried out in the absence of solvents and in the presence of an initiator consisting of a molecular combination of an alkali metal amide and the salt of the same alkali metal with at least one hydroxylic compound.

According to a first variant of the invention, the initiator is obtained by evaporating to dryness a solution/suspension of the alkali metal amide and of the hydroxylic compound in an organic solvent.

According to a second variant of the invention, the initiator is obtained by intimate dry mixing of the alkali metal amide with the hydroxylic compound.

Sodium amide, potassium amide or lithium amide can be used as alkali metal amides according to the present invention. Sodium amide has the advantage that it is an inexpensive commercial product.

Potassium amide can easily be manufactured using potassium and liquid ammonia, but it is more expensive than sodium amide. Lithium amide is less valuable than the preceding amides because it irritates the respiratory tracts and its average efficiency, within the scope of the invention, is below that of the preceding amides, except in the case of siloxanes.

As hydroxylic compounds which are particularly suitable for preparing the initiators used in the process according to the invention, there may be mentioned:

primary alcohols of the formula R—OH in which R is a linear alkyl group, preferably containing more than 2 carbon atoms, or a branched alkyl group or an alkyl group containing a cycloalkyl group or a cyclic ether group, or a linear alkyl group containing at least one ethylenic unsaturation and at least 2 carbon atoms or containing at least one aromatic group, secondary or tertiary alcohols of the formula R'—OH in which R' is a linear or branched alkyl group or a cycloalkyl group or a polycycloalkyl group, aromatic alcohols of the formula R"—OH in which R" is an aryl or polyaryl group which is optionally substituted by alkyl, alkoxy or aminoalkyl groups, bis-tertiary glycols having an alkyl chain, in which the hydroxyl groups are in the 1,2-, 1,3- or 1,4-positions, ether-alcohols, aminoalcohols, polyether-alcohols, polyaminoalcohols and polyaminoether-alcohols of the formula $R+Y-CHR_1-CHR_2)_nOH$ (I) in which R is an alkyl, cycloalkyl, arylalkyl, alkylaryl or aryl group, Y is an oxygen atom or a nitrogen atom substituted by an alkyl group (it being possible for the symbols Y to be all oxygens or all substituted nitrogens or, alternatively, for some to be oxygens and the others substituted nitrogens), $R_1$ and $R_2$ are identical or different and are a hydrogen atom, a methyl group or an ethyl group, Y necessarily being an oxygen when $R_1$ and/or $R_2$ are a methyl or ethyl group, and n is an integer from 1 to 10, the ether-alcohols of the formula:

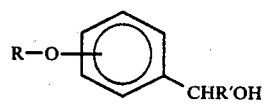

in which R has the above meaning and R' is a hydrogen atom or a group

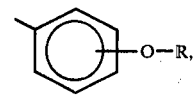

and enols of the ketones of the formula

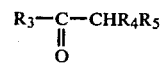

(vinyl alcohols) in which $R_3$ is a hydrocarbon group and $R_4$ and $R_5$ are identical or different and are a hydrogen atom or a hydrocarbon group.

Many other hydroxylic compounds can also be suitable, for example diolamines such as those of the formula

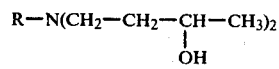

in which R=alkyl (in particular methyl), aminoalcohols such as those of the formula

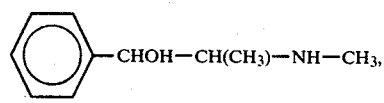

industrial mixtures of monoethers of polyalkoxyglycols of the formula (I) in which Y is oxygen and n has a value such that the chains contain up to 100 carbon atoms, and trialkylsilanols (other than trimethylsilanol). In addition to the above compounds, further hydroxylic compounds can be used in the process according to the invention. However, as is the case for the last compounds mentioned above, these are compounds having a relatively much smaller technical and/or economic value than that of the first compounds mentioned above. In general, the use of hydroxylic compounds which carry another function capable of reacting with the alkali metal halide will be avoided. Furthermore, the term hydroxylic compound according to the invention must be understood in the broadest sense; thus, thiols and thiophenols are included in the present invention by virtue of the fact that they contain mercaptan groups —SH which are obviously equivalent to the groups —OH. Finally, those hydroxylic compounds which would react with the initiator, or with the amide by itself, and be degraded (for example by polymerisation) or destroyed are naturally excluded from the field of the invention; of course, the formation of a salt of the hydroxylic compound must not be considered as a degradation.

To prepare the initiator, the number of molecules of amide which is to be used per hydroxyl function of the hydroxylic compound is preferably of the order of 3, that is to say between 2 and 3.5. This number can be slightly higher with no disadvantage, especially in the case where the moisture level in the equipment, in the monomer or in the hydroxylic compound must be reduced in order to carry out the polymerisation under good conditions. In fact, in this case, the excess amide advantageously neutralises the moisture present, without producing species capable of having a substantial influence on the subsequent course of the reaction. However, if this number is greater than, for example, 10, there is a risk of obtaining a weakly reactive or unreactive initiator. More generally, the initiator obtained in this case causes the appearance of a long induction period between the introduction of the monomer and the polymerisation of the latter. If, on the other hand, fewer than two mols of amide are used per hydroxyl function, the initiator is less efficient and can even totally lose its activity, especially if it is also employed in a particularly small amount relative to the monomer and/or if the initial moisture level in the equipment and the reactants is high. In other words, the optimum molar ratio of the amide to the "alkali metal alkoxide" functions within the reaction medium is about 2.

It has been stated that, according to a first variant of the process according to the invention, the initiator used is prepared in an organic solvent which is then evaporated to dryness. Any aprotic organic solvent which is relatively insensitive to attack by bases is suitable for this preparation. In general, it is preferred to use solvents of low polarity or non-polar solvents, which generally have a lower price than polar solvents which are, moreover, relatively more subject to degradation by the initiator or its components, especially at temperatures above 25° C. Consequently, it is preferred to use an aprotic solvent having a dielectric constant which is less than 10° to 25° C., for example linear or cyclic ethers and polyethers, such as tetrahydrofurane (THF), dimethoxyethane (DME), glymes, diglymes, triglymes, alkanes such as hexane or heptane, cycloalkanes such as cyclohexane, or arenes such as benzene or toluenes.

When using solvents containing ether bridges, it is important that the oxygen and peroxides present should be carefully removed by known methods.

In general, the initiator is advantageously prepared in the reactor which is subsequently used for the polymerisation, because this makes it possible to reduce the introduction of moisture into the equipment. The order of introduction of the reactants is of little importance, but, as a general rule, it is preferable to introduce the hydroxylic compound onto the amide, the one and/or the other being in solution or in suspension in the above-mentioned solvent. The solvent can also be introduced by itself, at the beginning or at the end. The reaction for the formation of the initiator is preferably carried out at between 20° and 60° C. in order to obtain a satisfactory duration. Below 0° C., the formation of the initiator generally becomes non-existent, whereas, above 60° C., there is an increasing risk of degrading the amide, the initiator formed or the solvent. It is recommended to stir the medium throughout the duration of the reaction, which duration is preferably at least one hour. Under unfavourable conditions (adoption of an unpreferred value for at least one of the parameters stated above), a duration of more than 4 hours can prove necessary.

The reaction for the formation of the initiator is generally accompanied, in this first variant, by the liberation of ammonia arising from the action of the amide anion on the proton of the hydroxylic compound. This phenomenon, which is generally easily perceptible, is not a sufficient condition for the success of the operation, since this liberation can also be due to the action of the amide on the moisture present in the medium. Furthermore, at most, it only proves the formation of the alkali metal salts of the hydroxylic compound and the mere fact that this coexists with the amide is not sufficient to obtain the initiator according to the invention, since the latter consists of a molecular combination of the amide and the salt of the hydroxylic compound. Therefore, although this molecular combination is formed rather easily, it is advisable to operate under at least one of the preferred conditions stated above, in order to obtain an initiator with a suitable yield and of suitable quality.

Once the reaction for the formation of the initiator has been carried out, the solvent used in the present variant is evaporated off to dryness, for example by placing the reactor in vacuo. This yields a pulverulent or pasty mass, depending on the nature of the hydroxylic compound used and the amount of amide relative to the latter. This mass can be fractionated, if desired, and is preferably handled under relatively anhydrous conditions, although the low price of its constituents permits losses by hydrolysis, which losses are, moreover, amply compensated by the fact that the constituents are more convenient to use. Thus, as has now been stated, it is possible to prepare large amounts of initiator in advance and to draw the desired amount from this reserve at the time of each polymerisation. It is also possible to keep the initiator in solution/suspension, withdraw the desired amount thereof and evaporate off the solvent to dryness only at the time of the polymerisation.

It is completely surprising that an initiator of this kind, of which the efficiency during polymerisation in the presence of a solvent has been demonstrated by the Applicant Company in her earlier work, possesses an excellent efficiency in the dry, whilst its activity can be attributed to molecular combinations, the stability of which seems hitherto to have been conditioned by the existence of a solvating environment. In fact, there are numerous examples of compounds which, when used in solution, have a very different reactivity from that in the crystalline state. This is the case of organomagnesium Grignard derivatives, the structure of these compounds in the crystalline state being not at all the same as their structure in solution.

It is even more surprising that, according to a second variant of the invention, the initiator used is prepared by intimate dry mixing of the alkali metal amide with the hydroxylic compound, that is to say in the absence of solvent. In this case, the amide and the hydroxylic compound are introduced, preferably in this order, into a reactor which, if it is found to be of advantage, can be the reactor in which the polymerisation reaction is subsequently carried out, after which these reactants are intimately mixed using any known means. This trituration operation is conveniently carried out, with a satisfactory result, by using a reactor provided with a stirring device and by operating at a temperature which is preferably between 20° and 60° C. In general, the formation of the initiator used in the present invention is satisfactory, according to this possible embodiment, after at least one hour and, in most cases, after a relatively longer time than in the case of the first variant.

According to a modification of the variant which has now been explained, the initiator is formed by placing the amide in contact with the hydroxylic compound, pouring the monomer onto the whole and then stirring, preferably under the conditions used in the above variants. In this embodiment, the initiator is formed in situ in the monomer which acts as the solvent before acting as the reactant, taking into account the induction period which generally exists between the moment when the constituents of the initiator are placed in contact and the formation of the molecular combinations which constitute the latter. Indeed, although it is of little value, it is also possible to envisage introducing the three relevant species in a different order.

It is quite clear that, without going outside the scope of the present invention, it is possible to use an initiator which would be formed according to one of the two preceding variants or according to the modification of the second of the preceding variants, in which the hydroxylic compound would be directly replaced by the salts of the hydroxylic compound with the alkali metal corresponding to the metal in the amide. However, this case, which might make it possible to use one less molecule of amide, is of little value because it does not make it possible to avoid one of the constraints of the prior art, which consists in preparing the initiator in advance; in fact, it would be necessary to prepare the said alkali metal salt of the hydroxylic compound separately and in advance.

In common with any anionic polymerisation process, the process according to the invention comprises an initiation stage, a propagation stage and a termination stage.

The temperature at which the actual propagation reaction is carried out is not necessarily the same as that used for forming the initiator and is between −80° and +70° C. This temperature can vary during the polymerization or between the stages of certain types of copolymerisation.

The amount of initiator which is to be used, relative to a given amount of monomer to be treated, depends on the desired molecular weight of the polymer. This molecular weight will generally decrease as the molar ratio of initiator/monomer increases. On average, a ratio of about 1:100 is employed, it being understood that the low price of the initiator more frequently permits the use of higher ratios than in the case of the earlier processes.

The duration of polymerisation varies from a few seconds to 24 and even 48 hours and depends on numerous factors, in particular the nature of the monomer.

The invention concerns those monomers which are known to polymerise by a purely anionic mechanism or, if preferred, those which are capable of anionic polymerisation by the opening of the ethylenic double bond or a heterocyclic ring. In view of the fact that the beginnings of anionic polymerisation date back more than a century, it is possible to imagine that the list of these monomers is very long, and this mechanism is very well known. However, it should be clearly understood that this mechanism is the same whether the monomer is a heterocyclic ring or whether it contains an ethylenic or aldehydic unsaturation (which can perhaps be considered as a heterocyclic ring having 2 atoms), since the initiation gives rise, by cleaving a bond, to the formation of a monomer anion which, regardless of the nature of the atom which carries the negative charge, attacks a further molecule of monomer which in turn carries the negative charge, and so on until the monomer is exhausted or the reaction is terminated. On this subject, there may be consulted, for example, the work of Professor Georges CHAMPETIER "Chimie Macromoléculaire" ("Macromolecular Chemistry"), volume I, published by Hermann, Paris (1969).

However, the following monomers can be mentioned as relevant monomers, without this list being exhaustive.

For vinyl monomers, those of the general formula $$\begin{array}{c}R_1\\ \diagdown\\ R_2\end{array}C=C\begin{array}{c}R_3\\ \diagup\\ R_4\end{array}$$

in which:
$R_1=R_2=R_3=R_4=H$ (ethylene)
$R_1=R_2=R_3=H$ and $R_4=$alkyl

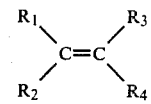

in which $X=H$, Cl, $-OCH_3$ or $-C(CH_3)_3$

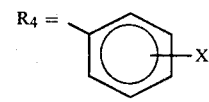

(in which $R'=$alkyl or cycloalkyl),

(in which $R''=$alkyl)

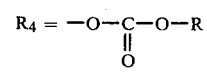

(in which $R=$alkyl, in particular methyl, or aryl, in particular phenyl) $R_1=R_2=H$, $R_3=-CH_3$, $R_4=$phenyl, cyano or

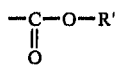

(R'=alkyl or cycloalkyl).

For heterocyclic monomers, alkylene oxides, alkylene sulphides, lactones, lactams, thientanes, siloxanes and cyclic carbonates, such as ethylene oxide, propylene oxide, propylene sulphide, $\beta$-propiolactone, $\epsilon$-caprolactone, pivalolactone, $\epsilon$-caprolactam, hexamethylcyclotrisiloxane, octamethylcyclotetrasiloxane, propylene, glycol carbonate, neopentylglycol carbonate and the like.

For conjugated dienic monomers, those of the general formula:

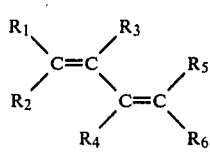

in which:
$R_1=R_2=R_3=R_4=R_5=R_6=H$ (buta-1,3-diene)
$R_1=R_2=R_4=R_5=R_6=H$ and $R_3=$alkyl or aryl
$R_1=R_2=R_3=R_4=R_5=H$ and $R_6=$alkyl, aryl, nitrile or nitro
$R_1=R_2=R_5=R_6=H$ and $R_3=R_4=-CH_3$
$R_1=CH_3$ and $R_2=R_3=R_4=R_5=R_6=H$ or alkyl
$R_1=R_3=R_4=R_5=H$ and $R_1=R_6=$phenyl.

For dienes having ethylenic double bonds which are not directly conjugated, divinylbenzene, substituted cyclohexadienes such as 3,3,6,6-tetramethylhexa-1,2-4,5-diene, vinyl or allyl carbonates of polyols or of polyether-polyols, such as the allyl carbonate of glycol.

The process according to the invention can be applied to homopolymerisation reactions and to copolymerisation reactions, either of monomers from the same family or of monomers from different families.

The monomers are purified, before use, in a known and customary manner which depends on their nature and which can range from simple distillation, which is generally employed, to double distillation over a molecular sieve, calcium hydride, an alkali metal or even over a living polymer (isopropenyl-lithium). However, the process according to the invention adapts itself to the presence of moisture in the monomer, because of the capacity possessed by the combined or uncombined amide, which is present in the initiator system, to neutralise this moisture. It is advisable to use suitably purified hydroxylic compounds, whereas it is possible to use an alkali metal amide mixed with the hydroxide formed therefrom, provided nevertheless that the exact proportion of pure amide in this mixture is known, so as to be able to observe the proportions, mentioned above, for making up the initiator. However, it is preferred to use an amide of commercial purity or, preferably, of analytical purity.

The particle size of the alkali metal amide is not critical and only influences the duration of the induction period between the moment when the initiator is placed in contact with the monomer and the polymerisation of the latter. In general, the initiator is formed all the more rapidly and, for a given monomer, it becomes all the more rapidly active when its initial state is more finely divided.

The polymerisation process according to the invention, which is preferably carried out under an inert gas atmosphere (in particular nitrogen and argon) or in vacuo, is of particular value when using the following initiators which have been denoted, by way of simplification, by the hydroxylic compound which is to be combined with the sodium, potassium or lithium amide;

a linear or branched primary alcohol such as: 2-methylpropanol, 2,2-dimethylpropanol, dodecanol and butanethiol, an alcohol containing a heterocyclic group, such as: tetrahydrofurfurol, an alcohol containing an ethylenic or aromatic unsaturation, such as: allyl alcohol, a secondary or tertiary alcohol such as: 2,6-dimethylheptan-3-ol, isopropanol, neopentanol, t-butanol, 2-methylhexan-2-ol, 2-methylbutan-2-ol and 5-n-butylnonan-5-ol, an alicyclic alcohol such as: 2-methylcyclohexanol, an aromatic alcohol such as: diethylaminophenol and thiophenol, a polyol, in particular a glycol, such as: 2,5-dimethylhexane-2,5-diol, an ether-alcohol such as: ethylene glycol methyl ether, ethylene glycol butyl ether, ethylene glycol phenyl ether, methoxyphenylmethanol and di-(methoxyphenyl)-methanol, a polyether-alcohol such as: diethylene glycol methyl ether, diethylene glycol ethyl ether, diethylene glycol butyl ether, diethylene glycol phenyl ether, diethylene glycol decyl ether, triethylene glycol ethyl ether, triethylene glycol butyl ether, pentaethylene glycol ethyl ether, and hexaethylene glycol ethyl ether, or an enol of a ketone, such as: diethyl ketone (enol form) and methyl phenyl ketone (enol form).

It should be noted that each of the initiators which can be used in the process according to the invention possesses its own spectrum of activity with regard to each monomer to the extent that the said process makes it possible to produce virtually all the desired characteristics of the final polymers.

The reaction can be terminated in a known manner, for example by introducing a small amount of a protonating agent such as an alcohol (methanol or hexanol) or by precipitating the reaction medium in a solvent which is easy to remove by filtration, such as methanol.

As regards the induction period observed before the start of the reaction, it depends to a significant degree on the variant used to prepare the initiator. All other things being equal, the induction period becomes shorter as the dielectric constant of the monomer, at the polymerisation temperature, increases. Furthermore, this period generally increases in the order: initiator prepared in a solvent medium (zero or very short induction) <initiator prepared in situ in the monomer <initiator prepared by dry trituration (generally non-zero induction). On the other hand, it has been observed that the molecular weights of the polymers obtained become concurrently higher and more polydisperse as the induction becomes longer. An increase in the dispersion and in the value of the weights is also observed when the molar proportion of amide/hydroxylic compound is lowered. Finally, the polymers and copolymers obtained by the process according to the invention carry an amino function at one or more of their ends; this constitutes a valuable advantage of the process according to the invention, compared with other possible bulk anionic polymerisation processes.

characteristics and the yield of the process have been indicated in the following columns:

TABLE 1

| Example No. | Hydroxylic compound | Solvent | Temperature | Yield | $\frac{Mw\ (2)}{Mn\ (1)}$ = I(3) |
|---|---|---|---|---|---|
| 1 | $C_4H_9(OCH_2CH_2)_2OH$ | THF | 45° C. | 100% | $\frac{250,000}{50,000} = 5$ |
| 2 | tetrahydrofurfurol | THF | 45° C. | 59% | $\frac{420,000}{42,000} = 10$ |
| 3 | $C_4H_9(OCH_2CH_2)_2OH$ | toluene | 45° C. | 100% | $\frac{296,000}{37,000} = 8$ |
| 4 | tetrahydrofurfurol | toluene | 45° C. | 100% | $\frac{150,000}{30,000} = 5$ |
| 5 | t-BuOH | toluene | 45° C. | 20% | $\frac{170,000}{17,000} = 10$ |
| 6 | neopentanol | THF | 45° C. | 11% | $\frac{750,000}{100,000} = 7.5$ |
| 7 | diethyl ketone (enol) | THF | 45° C. | 11% | $\frac{400,000}{70,000} = 5.7$ |
| 8 | i-PrOH | THF | 45° C. | 22% | $\frac{1,500,000}{250,000} = 6$ |
| 9 | $C_2H_5(OCH_2CH_2)_2OH$ | THF | 25° C. | 93% | $\frac{1,000,000}{45,000} = 22$ |

(1) Mn = number-average molecular weight
(2) Mw = weight-average molecular weight
(3) I = $\frac{Mw}{Mn}$ = polydispersity index.

This direct provision of functional groups on the polymers obtained by means of the invention, coupled especially with the fact that the initiator used is inexpensive and in several respects more convenient to use than the conventional initiators, and with the fact that the tedious removal of solvent at the end of the process is not necessary, shows the significant technical progress brought about by the present invention.

Taking into account that it makes it possible to obtain polymers having a wide variety of mean molecular weights, a molecular weight distribution and a microstructure, the process according to the invention is equally applicable to the manufacture of widely used polymers as to that of special polymers.

The following examples, relating to the polymerisation of polymers which are typical representatives of one of the three large families to which they belong, are given by way of illustrations of the process according to the invention, which is no way imply a limitation. These examples additionally show the vast range of possibilities offered by the invention.

EXAMPLES 1 to 20

Polymerisation of styrene.

(A) The initiator was prepared in a solvent which was subsequently evaporated off and the polymerisation was then carried out in the absence of solvent. $25.10^{-3}$ mols of sodium amide and $8.3.10^{-3}$ mols of the hydroxylic compound mentioned in the second column of Table 1 (molar ratio: 3) were introduced into the reactor provided for the polymerisation. In each case, 20 ml of the solvent mentioned in column 3 were added and the reaction mixture was heated for 2 hours at 40° C., whilst stirring, the said solvent then being evaporated off to dryness. Though the wall of the cap having a skirt which can be folded back, with which cap the reactor had been provided, 10 ml of freshly distilled styrene are injected, using a hypodermic syringe, onto the initiator which was in the form of a mobile powder. After 18 hours at the temperature indicated in column 4, the reaction was stopped by precipitating the mixture in methanol and the polymer was filtered off and dried. Its The change in the characteristics of the polymer and of the yield of the process was then studied by following the above procedure for preparing the initiator (in THF), but varying the molar ratio of amide/hydroxylic compound (in this case t-butanol). The polymerisation was carried out in each case at 45° C. and stopped after 18 hours. The results are summarised in Table 2.

TABLE 2

| Example No. | Ratio | Yield | Mn | Mw | I |
|---|---|---|---|---|---|
| 10 | 2 | 37% | 70,000 | 450,000 | 6.5 |
| 11 | 3 | 56% | 125,000 | 750,000 | 6 |
| 12 | 3.3 | 70% | 100,000 | 800,000 | 8 |
| 13 | 5 | 46% | 45,000 | 700,000 | 15.5 |
| 14 | 7 | 36% | 85,000 | 850,000 | 10 |
| 15 | 13 | 31% | 75,000 | 1,200,000 | 16 |

Finally, an experiment was carried out (45° C., 18 hours) using an initiator prepared from $25.10^{-3}$ mols of $NaNH_2$ and $5.10^{-3}$ mols of 1,6-dimethylhexane-2,5-diol. This gave a 10% yield of a polymer having the following characteristics: Mn=75,000, Mw=650,000, I=8.5 (Example 16).

(B) The initiator was prepared without a solvent and the polymerisation was also carried out in the absence of solvent.

$25.10^{-3}$ mols of $NaNH_2$ and $8.3.10^{-3}$ mols of the hydroxylic compound (column 2) were employed. These ingredients were triturated for 2 hours at 40° C., using the stirrer of the reactor provided for the polymerisation, and 10 ml of styrene were then injected. After respectively 1 hour (Experiments 17 to 19) and 18 hours (Experiment 20) at 35° C., this yielded the polymers having the characteristics indicated in Table 3.

TABLE 3

| Example No. | Hydroxylic compound | Yield | Mn | Mw | I |
|---|---|---|---|---|---|
| 17 | $C_4H_9(OCH_2CH_2)_2OH$ | 100 | 3,300 | 1,500,000 | 45 |
| 18 | t-BuOH | 100 | 15,000 | 100,000 | 6.6 |
| 19 | tetrahydrofurfurol | 100 | 22,000 | 200,000 | 9.9 |

TABLE 3-continued

| Example No. | Hydroxylic compound | Yield | Mn | Mw | I |
|---|---|---|---|---|---|
| 20 | $C_4H_9(OCH_2CH_2)_2OH$ | 100 | 1,500,000 | 1,000,000 | 6.6 |

EXAMPLES 21 to 28

Polymerisation of methyl methacrylate.

$25.10^{-3}$ mols of $NaNH_2$ and $8.3.10^{-3}$ mols of the hydroxylic compound were used to prepare the initiator in the presence of a solvent (toluene in Example 21 and THF in Examples 22 to 24) which was subsequently evaporated off, or without a solvent (Examples 25 to 28), over a period of 2 hours at 40° C. 10 ml of methyl methacrylate were then polymerised by injecting the freshly distilled monomer into the reactor. After the indicated time at 35° C., this yielded the polymers described in Table 4. The yields were 100% in each case.

TABLE 4

| Example No. | Hydroxylic compound | Duration of polymerisation | Mn |
|---|---|---|---|
| 21 | $C_4H_9(OCH_2CH_2)_2OH$ | 15 minutes | 20,000 |
| 22 | $C_4H_9(OCH_2CH_2)_2OH$ | 2 minutes | 35,000 |
| 23 | t-BuOH | 30 minutes | 18,000 |
| 24 | tetrahydrofurfurol | 1 hour | 20,000 |
| 25 | $C_4H_9(OCH_2CH_2)_2OH$ | instantaneous | 50,000 |
| 26 | $C_4H_9(OCH_2CH_2)_2OH$ | 1 hour | 52,000 |
| 27 | t-BuOH | 1 hour | 38,000 |
| 28 | tetrahydrofurol | 1 hour | 40,000 |

EXAMPLES 29 to 40

Polymerisation of acrylonitrile (AN) and methacrylonitrile (MAN).

The procedure of Examples 21 to 28 was followed, the initiator being prepared in some cases in the presence of solvent (Examples 29 to 34) and in other cases without a solvent (Examples 35 to 40). The polymerisation parameters and the characteristics of the polymers obtained are reported in Table 5.

TABLE 5

| Example NO. | Hydroxylic compound | Solvent | Volume of monomer in ml | Duration | Yield | Mn |
|---|---|---|---|---|---|---|
| 29 | $C_4H_9(OCH_2CH_2)_2OH$ | THF | AN, 10 | instantaneous | 100% | 12,000 |
| 30 | tetrahyrdofufurol | THF | An, 10 | instantaneous | 100% | 10,000 |
| 31 | t-BuOH | THF | An, 10 | instantaneous | 100% | 9,500 |
| 32 | $C_4H_9(OCH_2CH_2)_2OH$ | toluene | AN, 10 | instantaneous | 100% | 16,300 |
| 33 | tetrahyrofurfurol | toluene | AN, 10 | instantaneous | 100% | 18,000 |
| 34 | T-BuOH | toluene | An, 10 | instantaneous | 100% | 12,000 |
| 35 | $C_4H_9(OCH_2CH_2)_2OH$ | — | AN, 5 | 30 minutes | 100% | 25,000 |
| 36 | t-BuOH | — | AN, 4 | 1 hour | 100% | 23,000 |
| 37 | tetrahydrofurfurol | — | AN, 7 | 1 hour | 100% | 19,500 |
| 38 | $C_2H_5(OCH_2CH_2)_2OH$ | — | MAN, 3 | 5 minutes | 80% | 17,500 |
| 39 | t-BuOH | — | MAN, 5 | 15 min. | 75% | 8,500 |
| 40 | tetrahyrdofufurol | — | MAN, 8 | 30 minutes | 100% | 12,300 |

EXAMPLES 41 and 42

Polymerisation of methyl vinyl carbonate.

The initiator was prepared from $25.10^{-3}$ mols of $NaNH_2$ and $8.3.10^{-3}$ mols of $C_4H_9(OCH_2CH_2)_2OH$ (Example 41) or of tetrahydrofurfurol (Example 42) in THF. After 2 hours at 40° C., the THF is evaporated to dryness from the mixture obtained. 10 ml of the monomer were polymerised at 35° C. and the reaction was stopped after 18 hours.
This yielded the following polymers:
Example 41: yield 20%, Mn=13,500
Example 42: yield 50%, Mn=13,000

EXAMPLES 43 to 49

Polymerisation of isoprene.

The procedure of Examples 29 to 40 was followed. The polymerisation parameters and the characteristics of the polymers obtained are reported in Table 6. The duration of the reaction was 18 hours except in the case of Example 48 (4 hours).

TABLE 6

| Ex. No. | Hydroxylic compound | Solvent | Volume of monomer | Yield | Mn |
|---|---|---|---|---|---|
| 43 | $C_4H_9(OCH_2CH_2)_2OH$ | toluene | 15 ml | 40% | 2,500 |
| 44 | tetrahydrofurfurol | toluene | 10 ml | 50% | 1,200 |
| 45 | t-BuOH | toluene | 10 ml | 20% | 2,750 |
| 46 | t-BuOH | THF | 15 ml | 30% | 1,700 |
| 47 | $C_4H_9(OCH_2CH_2)_2OH$ | THF | 10 ml | 38% | 4,000 |
| 48 | $C_2H_5(OCH_2CH_2)_2OH$ | THF | 10 ml | 30% | 2,500 |
| 49 | $C_4H_9(OCH_2CH_2)_2OH$ | — | 10 ml | 10% | 800 |

EXAMPLES 50 to 54

Polymerisation of 2,3-dimethylbutadiene.

The procedure of the preceding Examples 43 to 49 was followed. The polymerisation was carried out using 10 ml of monomer in each case.
Parameters and results are reported in Table 7.

TABLE 7

| Ex. No. | Hydroxylic compound | Solvent | Duration | Yield | Mn |
|---|---|---|---|---|---|
| 50 | $C_4H_9(OCH_2CH_2)_2OH$ | THF | 18 hours | 55% | 6,800 |
| 51 | tetrahydrofurfurol | THF | 10 minutes | 100% | 6,200 |
| 52 | " | toluene | 10 minutes | 100% | 2,700 |
| 53 | $C_4H_9(OCH_2CH_2)_2OH$ | toluene | 2 hours | 71% | 3,300 |
| 54 | t-BuOH | toluene | 48 hours | 31% | 3,500 |

EXAMPLES 55 and 56

Polymerisation of styrene.

An attempt was made to polymerise 20 ml of styrene at 25° C. on $18.10^{-3}$ mols of potassium amide.

After 18 hours, this yielded 3% of polymer having the following weights:

Mn=25,000, Mw=600,000, I=24 (Example 55).

Under the same conditions, but in the presence of $3.10^{-3}$ mols of $C_2H_5(OCH_2CH_2)_2OH$ mixed with $18.10^{-3}$ mols of potassium amide for 2 hours at 40° C. in the absence of solvent, the yield was 100% after only 2 hours. The polystyrene obtained had the following weights:

Mn=40,000, Mw=600,000, I=15 (Example 56).

EXAMPLES 57 and 58

Polymerisation of ethylene oxide.

The initiator was prepared from $25.10^{-3}$ mols of $NaNH_2$ and $8.3.10^{-3}$ mols of $C_4H_9(OCH_2CH_2)_2OH$ over a period of 2 hours at 40° C. in, respectively, 20 ml of THF (Example 57) and of toluene (Example 58).

After evaporating off the solvent to dryness, this gave:

in the first case (Example 57), with 11.8 ml of monomer, the instantaneous formation of a white sludge and, after 18 hours, a 100% yield of polymer (Mn=15,000, measured by osmometry), and in the second case (Example 58), with 10.6 ml of monomer, the instantaneous formation of a yellowish sludge and, after 17 hours, a quantitative yield of polymer (Mn=25,000, measured by osmometry).

EXAMPLES 59 and 60

Polymerisation of the cyclic carbonate of 2-ethyl-2-hydroxymethylhexanol (or 2-ethyl-2-butyl-1,3-carbonyldioxypropane).

$25.10^{-3}$ mols of $NaNH_2$ were placed in a reactor and 10 ml of monomer were then poured in. After heating for 3 hours at 45° C., there is no apparent sign of polymerisation. After a further 24 hours at ambient temperature, the viscosity of the medium remains virtually unchanged (Example 59).

On the other hand, if $8.4.10^{-3}$ mols of $C_2H_5(OCH_2CH_2)_2OH$ and 10 ml of monomer are successively poured onto the same initial amount of sodium amide, and if the medium is stirred whilst heating for 3 hours at 45° C., then the said medium becomes gradually thicker. If the polymer is then left to stand at ambient temperature, the stirrer is blocked after one hour. The polymer obtained, which is extracted using 2 ml of methanol, precipitated in hexane and then filtered off, possesses a weight of 465 (measured by vapour pressure osmometry in 1,2-dichloroethane at 37° C.) (Example 60).

EXAMPLES 61 and 62

Polymerisation of pivalolactone.

The initiator was prepared by heating $25.10^{-3}$ mols of $NaNH_2$ and $8.5.10^{-3}$ mols of $C_2H_5(OCH_2CH_2)_2OH$ for 2 hours at 40° C.

The mixture was brought back to ambient temperature and 10 ml of monomer were then injected onto the initiator. The medium solidifies instantaneously. The violent and exothermic reaction gives a quantitative yield of a polymer having a melting point of 180° C. (Example 61).

An attempt was made to carry out the same polymerisation using sodium amide by itself, all other conditions being similar. In this case, the polymerisation does not take place instantaneously and it is necessary to wait two hours before the viscosity of the medium begins to increase (Example 62).

EXAMPLE 63

Polymerisation of methyl methacylate using lithium amide and $C_4H_9(OCH_2CH_2)_2OH$.

$25.10^{-3}$ mols of $LiNH_2$ and $8.3.10^{-3}$ mols of $C_4H_9(OCH_2-CH_2)_2OH$ were placed in the polymerisation reactor and 10 ml of monomer were introduced immediately after the polyetheralcohol.

After 4 hours at 35° C., the polymer was killed by adding methanol and then precipitated in methanol and filtered off. The polymethyl methacrylate obtained has a number-average molecular weight of 5,000. The yield is 25%.

Infra-red spectra of the polymers obtained in Examples 17, 44, 49 and 60 were run. Each spectrum showed the existence of an intense absorption band centered at between 1,600 and 1,630 $cm^{-1}$, corresponding to the amino function teminating these polymers.

It should be noted that all the polymerisations reported in the above examples were carried out under an argon atmosphere.

EXAMPLES 64 to 67

Hydroxylic derivatives in the broad sense were used to polymerise monomers using the process according to the invention.

For this purpose, 8.3 mmols of butanethiol (Example 64) or of thiophenol (Examples 65 to 67) were placed in contact with 25 mmols of sodium amide. This mixture was heated for two hours at 40° C., whilst stirring, and the amount of monomer indicated in column 1 of Table 8 was then introduced. The polymerisation was allowed to proceed for the duration indicated in column 2 at the temperature indicated in column 3. The yields and number-average molecular weights obtained have been indicated in columns 4 and 5.

TABLE 8

| Example No. | Monomer mmols | Duration | Temperature | Yield | Mn |
|---|---|---|---|---|---|
| 64 | styrene | 24 hours | 40° C. | 80% | 6,300 |
| 65 | methyl methacrylate | 18 hours | 40° C. | 60% | 8,900 |
| 66 | acrylonitrile | 24 hours | 35° C. | 70% | 4,600 |
| 67 | 2-vinylpyridine | 24 hours | 40° C. | 60% | 5,600 |

EXAMPLES 68 to 72

Polymerisation of methyl methacrylate.

The initiator was prepared as in Examples 64–67 from 8.3 mmols of activator and 25 mmols of lithium amide. 10 ml of methyl methacrylate were then run in and the polymerisation was allowed to proceed at 40° C. After the time indicated, the polymer was killed with methanol and the yields, weights and indices indicated in Table 9 were observed.

TABLE 9

| Example No. | Compound combined | Duration | Yield | $M_n$ | $M_w$ | I |
|---|---|---|---|---|---|---|
| 68 | octanol | 2 hours | 25% | 12,000 | 18,000 | 1.5 |
| 69 | isopropanol | 1 hour | 25% | 8,900 | 12,500 | 1.4 |
| 70 | $CH_3OCH_2CH_2OH$ | 2 hours | 45% | 7,100 | 9,200 | 1.3 |
| 71 | $C_2H_5(OCH_2CH_2)_2OH$ | 2 hours | 70% | 9,900 | 11,900 | 1.2 |
| 72 | allyl alcohol | 2 hours | 30% | 8,100 | 11,300 | 1.4 |

EXAMPLES 73 to 77

Polymerisation of methacrylonitrile.

The procedure of Examples 68–72 was carried out using $LiNH_2$.

The volume of monomer indicated was polymerised at 35° C.

The reaction was stopped after 15 minutes. The results are reported in Table 10.

TABLE 10

| Example No. | Volume of monomer | Yield | $M_n$ |
|---|---|---|---|
| 73 | 2 ml | 47% | 3,200 |
| 74 | 4 ml | 43% | 4,100 |
| 75 | 3 ml | 52% | 3,800 |
| 76 | 3 ml | 60% | 4,100 |
| 77 | 3 ml | 62% | 5,200 |

EXAMPLES 78 to 83

The procedure of Examples 68–72 was followed in all respects, replacing $LiNH_2$ by $NaNH_2$ and using the hydroxylic compounds which are indicated below, together with the results obtained, in Table 11.

TABLE 11

| Example No. | Hydroxylic compound | Duration | Yield | $M_n$ | $M_w$ | I |
|---|---|---|---|---|---|---|
| 78 | heptanol | 2 hours | 15% | 9,200 | 13,800 | 1.50 |
| 79 | octanol | 2 hours | 85% | 10,800 | 15,500 | 1.44 |
| 80 | isopropanol | 2 hours | 90% | 9,400 | 14,000 | 1.49 |
| 81 | allyl alcohol | 1.5 hours | 100% | 2,700 | 3,700 | 1.35 |
| 82 | $CH_3OCH_2CH_2OH$ | 2 hours | 65% | 11,000 | 18,000 | 1.63 |
| 83 | $C_2H_5NHCH_2OH$ | 2 hours | 25% | 8,700 | 12,000 | 1.5 |

EXAMPLES 84 to 88

Acrylonitrile was polymerised using $LiNH_2$, 8.3 mmols of hydroxylic compound and 25 mmols of $LiNH_2$ being employed.

The initiator was prepared as described in Examples 68–72. The results obtained are reported in Table 12. The polymerisation temperature was 40° C. and the duration of the polymerisation was 15 minutes.

TABLE 12

| Example No. | Hydroxylic compound | Volume of monomer | Yield | $M_n$ |
|---|---|---|---|---|
| 84 | heptanol | 4 ml | 50% | 12,500 |
| 85 | octanol | 4 ml | 53% | 14,300 |
| 86 | isopropanol | 4 ml | 38% | 17,800 |
| 87 | allyl alcohol | 5 ml | 60% | 14,100 |
| 88 | $CH_3OCH_2CH_2OH$ | 5 ml | 62% | 13,300 |

EXAMPLES 89 to 93

Methacrylonitrile was polymerised using the initiator prepared as in Examples 68–72, 25 mmols of $NaNH_2$ and 8 mmols of hydroxylic compound being employed. The polymerisation reaction, which is carried out at 30° C., is instantaneous.

TABLE 13

| Example No. | Volume of monomer | Hydroxylic compound | Yield | $M_n$ |
|---|---|---|---|---|
| 89 | 3 ml | heptanol | 69% | 4,800 |
| 90 | 4 ml | octanol | 80% | 6,200 |
| 91 | 4 ml | isopropanol | 95% | 4,900 |
| 92 | 3 ml | allyl alcohol | 100% | 5,700 |
| 93 | 5 ml | $CH_3OCH_2CH_2OH$ | 100% | 4,900 |

EXAMPLES 94 to 98

The procedure of Examples 89 to 93 was followed, using the initiator to polymerise acrylonitrile. The reaction is instantaneous at 30° C.

TABLE 14

| Example No. | Volume of monomer | Hydroxylic compound | Yield | $M_n$ |
|---|---|---|---|---|
| 94 | 5 ml | heptanol | 70% | 22,000 |
| 95 | 8 ml | octanol | 90% | 17,500 |
| 96 | 4 ml | isopropanol | 95% | 19,400 |
| 97 | 4 ml | allyl alcohol | 100% | 23,100 |
| 98 | 5 ml | $CH_3OCH_2CH_2OH$ | 100% | 25,200 |

We claim:

1. Process for the polymerisation or copolymerisation of vinyl and dienic monomers, which consists of carrying out the reaction in the absence of solvent and in the presence of an initiator consisting of a molecular combination of an alkali metal amide which is sodium amide, potassium amide or lithium amide with at least one hydroxylic compound which is a member selected from the group consisting of primary alcohols of the formula R—OH in which R is a linear alkyl group, preferably containing more than 2 carbon atoms, or a branched alkyl group or an alkyl group containing a cycloalkyl group or a cyclic ether group, or a linear alkyl group containing at least one ethylenic unsaturation and at least 2 carbon atoms or containing at least one aromatic group, secondary or tertiary alcohols of the formula R'—OH in which R' is a linear or branched alkyl group or a cycloalkyl group or a polycycloalkyl group, aromatic alcohols of the formula R"—OH in which R" is an aryl or polyaryl group which is optionally substituted by alkyl, alkoxy or aminoalkyl groups, bis-tertiary glycols having an alkyl chain, in which the hydroxyl groups are in the 1,2-,1,3- or 1,4-positions, ether-alcohols, aminoalcohols, polyether-alcohols, polyaminoalcohols and polyaminoether-alcohols of the formula R$-(-$Y—CHR$_1$—CHR$_2-)-_n$OH (I) in which R is an alkyl, cycloalkyl, arylalkyl, alkylaryl or aryl group, Y is an oxygen atom or a nitrogen atom substituted by an alkyl group, the symbol Y being all oxygen or all substituted nitrogen atoms or, being both oxygen atoms and substituted nitrogen atoms, R$_1$ and R$_2$ are identical or different and are a hydrogen atoms, a methyl group or an ethyl group, Y being oxygen when at least one of R$_1$ and R$_2$ is a methyl or ethyl group, and n is an integer from 1 to 10, the ether-alcohols of the formula:

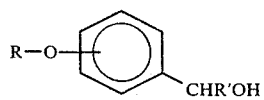

in which R has the above meaning and R' is a hydrogen atom or a group

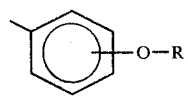

enols of the ketones of the formula

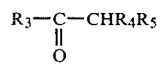

in which R$_3$ is a hydrocarbon group and R$_4$ and R$_5$ are identical or different and are a hydrogen atom or a hydrocarbon group, diolamines such as those of the formula

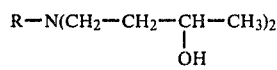

in which R=alkyl,
aminoalcohols of the formula

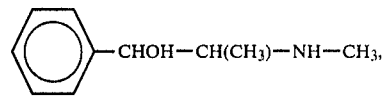

industrial mixtures of monoethers of polyalkoxyglycols of the formula (I) in which Y is oxygen and n has a value such that the chains contain up to 100 carbon atoms, trialkylsilanols, other than trimethylsilanol, and thiols and, said initiator being prepared by employing 2-3.5 moles of.

2. Polymerisation or copolymerisation process according to claim 1, wherein the initiator is obtained by evaporating to dryness a solution/suspension of the alkali metal amide and of the hydroxylic compound in an organic aprotic solvent having a dielectric constant which is less than 10° at 25° C.

3. Polymerisation or copolymerisation process according to claim 1, wherein the initiator is obtained by intimate dry mixing of the alkali metal amide with the hydroxylic compound.

4. Polymerisation or copolymerisation process according to claim 1, wherein the initiator is formed by placing the alkali metal amide in contact with the hydroxylic compound, introducing the monomer onto the whole and then stirring the medium thus obtained.

5. Process according to claim 2, or 3, wherein the initiator is prepared at a temperature between 20 and 60° C.

6. Process according to claim 1, wherein the hydroxylic compound is chosen from the group comprising: 2-methylpropanol, 2,2-dimethylpropanol, dodecanol, tetrahydrofurfurol, allyl alcohol, 2,6-dimethylheptan-3-ol, isopropanol, neopentanol, t-butanol, 2-methylhexan-2-ol, 2-methylbutan-2-ol, 5-n-butylnonan-5-ol, 2-methylcyclohexanol, diethylaminophenol, 2,5-dimethylhexane-2,5-diol, ethylene glycol methyl ether, ethylene glycol butyl ether, ethylene glycol phenyl ether, methoxyphenolmethanol, di-(methoxyphenyl)-methanol, diethylene glycol methyl ether, diethylene glycol ethyl ether, diethylene glycol butyl ether, diethylene glycol phenyl ether, diethylene glycol decyl ether, triethylene glycol ethyl ether, triethylene glycol butyl ether, pentaethylene glycol ethyl ether, hexaethylene glycol ethyl ether, diethyl ketone (enol form) and methyl phenyl ketone (enol form).

* * * * *